Feb. 21, 1928.
R. G. PHELPS ET AL
METHOD AND APPARATUS FOR MAKING STEMS
Filed Jan. 17, 1925    2 Sheets-Sheet 1
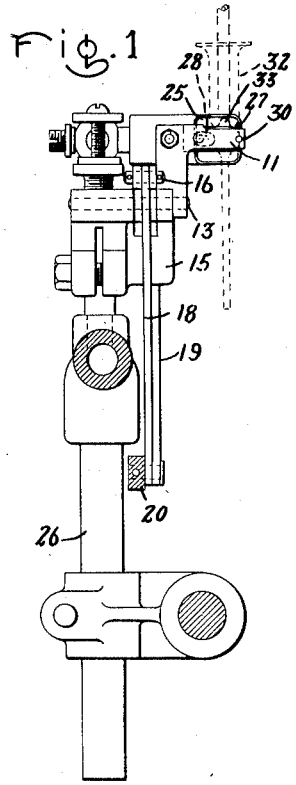
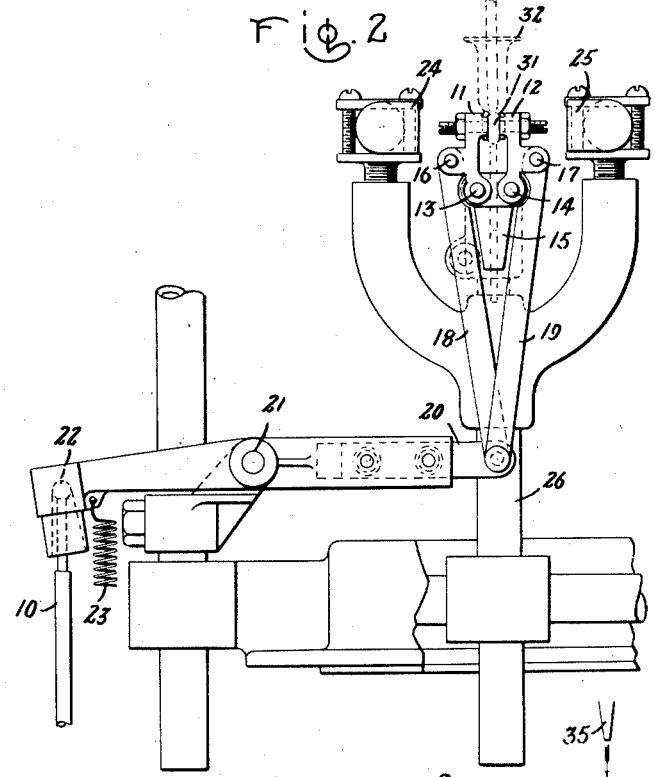
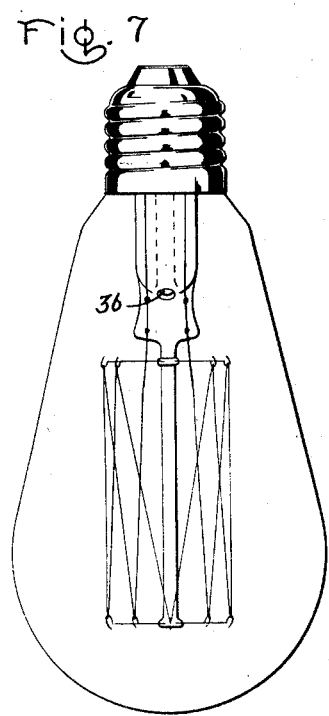
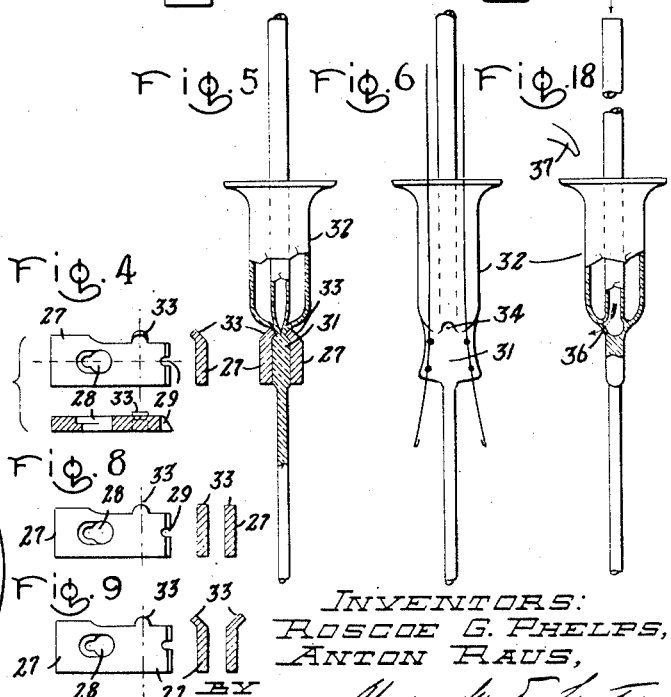
INVENTORS:
ROSCOE G. PHELPS,
ANTON RAUS,
BY
THEIR ATTORNEY Feb. 21, 1928.
R. G. PHELPS ET AL
1,659,613
METHOD AND APPARATUS FOR MAKING STEMS
Filed Jan. 17. 1925        2 Sheets-Sheet 2
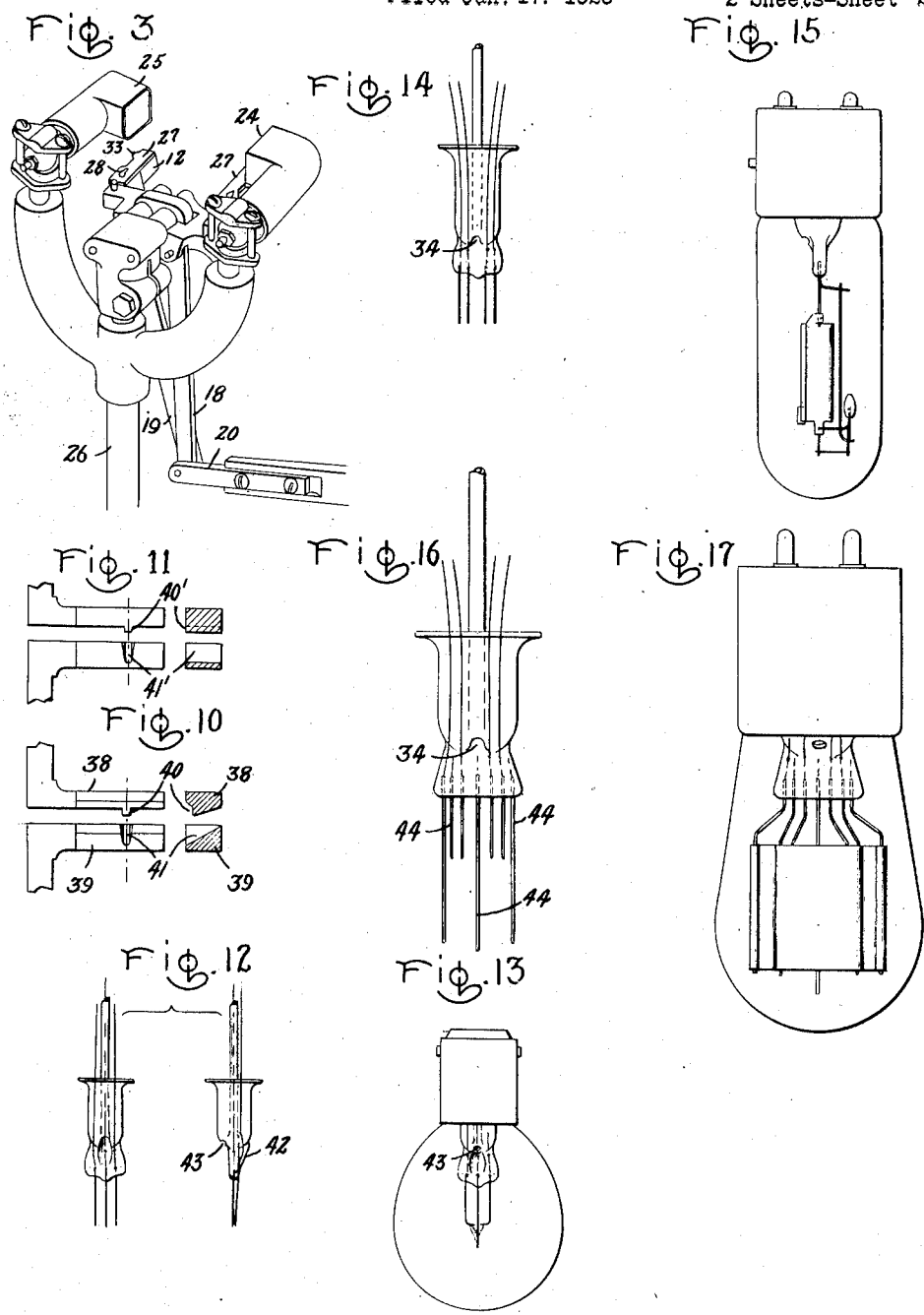
INVENTORS:
ROSCOE G. PHELPS,
ANTON RAUS,
BY
THEIR ATTORNEY.

Patented Feb. 21, 1928.

1,659,613

UNITED STATES PATENT OFFICE.

ROSCOE G. PHELPS AND ANTON RAUS, OF CLEVELAND, OHIO, ASSIGNORS TO GENERAL ELECTRIC COMPANY, A CORPORATION OF NEW YORK.

METHOD AND APPARATUS FOR MAKING STEMS.

Application filed January 17, 1925. Serial No. 3,020.

Our invention relates to tipless lamps, vacuum tubes and other electrical devices. It comprises an improvement on the invention disclosed in the Mitchell and White Patents 1,423,956 and 1,423,957 of July 25, 1922. This application is, for the most part, a continuation of our application Serial No. 680,233, filed December 12, 1923.

According to the Mitchell and White process, the stem of the lamp, vacuum tube or other similar device has an exhaust tube united thereto. During the process a solid mass of glass is formed at the inner end of the stem which unites the stem tube to the exhaust tube. The leading-in conductors are sealed in this mass of glass and an aperture is blown through the mass extending therethrough to the passage in the exhaust tube. It is through this exhaust tube that the lamp or other device is afterwards evacuated or gas filled. Our invention comprises a method and apparatus for more definitely localizing the blow out so that the aperture is positioned more accurately. Moreover, the rapidity of operation is increased. While applicable generally to the manufacture of stems according to the Mitchell and White process, our invention finds particular application in the case of vacuum tubes and multiple filament incandescent lamps in which there are more than two leading-in conductors sealed in the stem.

According to our invention the glass mass above referred to is indented at the locus of the blow out. Inasmuch as this glass mass is clamped around the leading-in wires according to the Mitchell and White process, and in fact other processes for making stems of a different type, we prefer to make the indentation at the same time as this clamping operation is performed.

In the drawing, Fig. 1 is a side elevation partially in section of a portion of a stem making machine embodying our invention; Fig. 2 is a front elevation thereof; Fig. 3 is a perspective view thereof; Fig. 4 is an elevation, vertical section and horizontal section, of a form of clamping jaw matrix; Fig. 5 is a vertical section showing a stem and the matrices in operative relation thereto; Fig. 6 is an elevation of the stem just before the blowing out operation, said stem being of the type used in the ordinary electric incandescent lamps; Fig. 7 is an elevation showing an incandescent lamp of the vacuum type comprising the completed stem; Figs. 8 and 9 comprise elevations and vertical sections of matrices constituting modifications of those shown in Fig. 4; Figs. 10 and 11 comprise elevations and vertical sections of modifications suitable for making stems in which are sealed a number of leading-in wires, for instance three, in which one of the leading-in wires is located at the center of the stem; Fig. 12 comprise elevations showing such a stem just before the blowout; Fig. 13 is an elevation of an incandescent lamp comprising the completed stem; Fig. 14 is an elevation of a partially completed stem used for certain vacuum tubes; Fig. 15 is an elevation of such a vacuum tube; Fig. 16 is an elevation of a partially completed stem used for another type of vacuum tube; Fig. 17 is an elevation of such a vacuum tube; and Fig. 18 is a partially diagrammatic view showing the manner in which the aperture is blown in the stem.

Although our invention is applicable to stem machines in general of the type disclosed in the Mitchell and White patents hereinbefore referred to, we have shown it in Figs. 1, 2 and 3 applied to parts which may be incorporated in a machine of the type disclosed in application Serial No. 667,584, filed October 9, 1923, for Fagan and Staudenmeir. In that application is disclosed an automatic machine for making tipless stems which, as shown, comprises jaws which are actuated to clamp a portion of the stem which has been previously fused. The said clamping jaws are actuated by proper cams and connecting mechanism. The rod 10 is part of the connecting mechanism by which the said jaws are actuated. The jaws 11—12 are pivotally mounted at 13 and 14 respectively on a bearing block 15. The said jaws are pivotally connected at 16—17 respectively to actuating levers 18—19 which are connected to the lever 20, which is fulcrumed at 21 and having connected to the other end thereof the aforesaid rod 10 by universal joint 22. The lever 20 is actuated against the tension of a spring 23 and such actuation causes the jaws 11—12 to be brought to the closed position shown in Fig. 2, or to the open position shown in Fig. 3. As usual, the gas burners 24—25 are positioned in juxtaposition to the stem end which is to be fused and these burners are supplied through a gas pipe 26 in the usual manner.

In Fig. 4 is shown one form of clamping jaw matrix 27. The term matrix is applied to the removable member which is attached to the inner face of the jaw which contacts with the glass. Of course the jaw itself may be shaped in the manner shown, but it is desirable on account of the injurious action of the heat to provide removable matrices. The matrices 27 are attached to the inner faces of the clamping jaws 11—12 by means of screws which pass through slots 28, said slots being of such shape that by merely loosening the screws and slightly moving the matrices, they may be removed. In order to insure accuracy in attaching said matrices, recesses 29 are provided which rest against pins 30 attached to the clamping jaws, as shown in Fig. 1. As that portion of the stem which is to be clamped is rendered sufficiently plastic by the flame from the burners 24—25, the clamping jaws 11—12 are raised to the position shown in Fig. 2, thus bringing the matrices 27 against the lower part 31 of the stem 32. As it is desired to indent the fused mass at the locus of blow out, we provide similar projections or lugs 33 extending from the upper edge of each matrix 27. Although it is obvious that these may be of various widths, we prefer a width substantially that of the passage in the exhaust tube. As shown in Figs. 4 and 5, these lugs 33 extend inwardly at a slight angle although they may extend in line with the body of the matrix, or even extend outwardly as shown in Figs. 8 and 9. Pairs of jaws in each of which the projection or lug is in line with the body of the matrix, as shown in Fig. 8, may be used or a pair of jaws in each of which the lug or projection extends outwardly from the body of the matrix, as shown in Fig. 9, may be used, or one matrix may have the lug or projection in line therewith and the other have it extending outwardly or inwardly. These combinations are all more or less effective but we prefer the combination shown in Figs. 4 and 5.

When the mass of plastic glass of the stem is clamped there is produced by means of the lugs 33, an indentation 34, and when air is forced into the exhaust tube by means of the jet 35, the blow out occurs at this indented portion 34 forming the aperture 36 as shown in Fig. 18. It is the practice to force air in around the exhaust tube by means of a jet 37. This tends to round out the junction between the walls of the stem tube and exhaust tube and reduces strains.

In Fig. 10 a modification is shown which is especially adapted for use in the manufacture of stems containing an odd number of leading-in conductors, and in which it is desired to locate one of the leading-in wires at the center. Such a construction is used, for instance, in the case of two-filament incandescent lamps shown in Fig. 13. The jaws 38 and 39 have matrices shaped to produce an offset portion in the stem. The lug or extension 40 on the matrix of jaw 38 is in line with the recess 41 of jaw 39. When the jaws are in the closed position, the extension 40 forces the center portion of the fused glass mass into the recessed portion 41, thus forming the offset 42 in the clamped portion of the glass stem. That portion of the central leading-in conductor located in the clamped stem portion is consequently forced over into the offset. The aperture 43 blows out at the side opposite to the offset. The glass contacting face of the extension 40 is preferably inclined and the recess is correspondingly shaped.

In Fig. 11, however, we have shown matrices having an extension 40' and a recess 41', the glass contacting faces of which are parallel to the general direction of the glass contacting face of the rest of the matrix.

In Fig. 14 we have shown a stem suitable for radio vacuum tubes of the type shown in Fig. 15. In this case there are four leading-in conductors and the forms of matrices shown in Figs. 4, 8 and 9 are used. This is true also of the stem shown in Fig. 16 which is used for the type of radio vacuum tube shown in Fig. 17. In this type there are four leading-in conductors, although there are extra supports 44 sealed into the stem. However, in this case the forms of matrices shown in Figs. 4, 8 and 9 may be used as an offset such as shown in Fig. 10 is not necessary as it would be if there were a central leading-in conductor.

What we claim as new and desire to secure by Letters Patent of the United States, is:

1. The method of glass working which comprises inserting a glass tube into another hollow glass body, applying heat to cause the formation of a solid glass mass closing off the tube and glass body, clamping said solid glass mass to produce an indentation substantially in line with said tube and then forming a passage extending through said indented portion and communicating with the passage of said tube.

2. The method of making stems for electric incandescent lamps and other sealed devices which consists in assembling a stem tube and an exhaust tube with the latter inside of the former, fusing together portions of said tubes to produce a solid mass of glass closing off said tubes, indenting said fused mass substantially in line with said exhaust tube and then forming a passage through said indented portion communicating with the passage of said exhaust tube.

3. The method of making stems for electric incandescent lamps and other sealed devices which consists in assembling a stem tube and an exhaust tube with the latter inside of the former, fusing portions of said tubes together to form a solid mass closing them off, clamping said mass and producing an indentation therein substantially in line with the said exhaust tube and then forming a passage extending through said indented portion and communicating with the passage of said exhaust tube.

4. The method of glass working which comprises inserting a glass tube into another hollow glass body, applying heat to cause the formation of a solid glass mass closing off the tube and glass body, clamping said mass and producing an indentation therein substantially in line with said tube and then blowing through said tube to form a passage extending through said indentation and communicating with the passage of said tube.

5. The method of making stems for electric incandescent lamps and other sealed devices which consists in assembling a stem tube and an exhaust tube with the latter inside of the former, fusing together portions of said tubes to produce a solid mass of glass closing them off, indenting said mass substantially in line with said exhaust tube and then blowing through said exhaust tube to form a passage through said indented portion communicating with the passage of said exhaust tube.

6. The method of making stems for incandescent lamps and other sealed devices which consists in assembling a stem tube and an exhaust tube with the latter inside of the former, fusing portions of said tubes together to produce a solid mass closing them off, clamping said mass to flatten the same and to produce an indentation therein substantially in line with said exhaust tube, and then blowing through said exhaust tube to form a passage extending through said restricted portion and communicating with the passage of said exhaust tube.

7. The method of making stems for electric incandescent lamps and other sealed electrical devices which consists in assembling a stem tube, an exhaust tube and leading-in conductors with the exhaust tube inside of the stem tube and the leading-in conductors disposed between said tubes, fusing portions of said tubes together producing a fused mass of glass closing off said tubes and enclosing said leading-in conductors, clamping said mass about said conductors and producing an indentation therein substantially in line with said exhaust tube and then blowing through said exhaust tube to form a passage extending through said indented portion and communicating with the passage of said exhaust tube.

8. The combination with a machine comprising means for supporting an assembly of stem parts including a stem tube and an exhaust tube with the latter extending longitudinally within the former, of a fusing means mounted so as to fuse a portion of said assembly at one end thereof, a pair of jaws shaped to produce an indentation in the fused mass substantially in line with said exhaust tube, and means for actuating said jaws to clamp the mass formed by the fusing operation.

9. The combination with a machine comprising means for supporting in a substantially vertical position an assembly of stem parts including a stem tube and an exhaust tube with the latter extending longitudinally within the former, of a fusing means mounted so as to fuse a portion of said assembly at one end thereof, a pair of jaws shaped to produce an indentation in the fused mass substantially in line with said exhaust tube, and means for actuating said jaws to clamp the mass formed by the fusing operation.

10. In a stem making apparatus adapted to be mounted in operative relation to an assembly of stem parts comprising a stem tube and an exhaust tube extending longitudinally within said stem tube, the combination of means for forming a fused mass of a portion of said assembly, a pair of jaws and means for actuating them to clamp said fused mass, one at least of said jaws being provided with a lug to produce an indentation within said mass substantially opposite the end of said exhaust tube.

11. In a stem making apparatus adapted to be mounted in operative relation to an assembly of stem parts supported in a substantially vertical position, comprising a stem tube and an exhaust tube extending longitudinally within said stem tube, the combination of means for forming a fused mass of a portion of said assembly, a pair of jaws and means for actuating them to clamp said fused mass, one at least of said jaws being provided with a lug extending upwardly therefrom to produce an indentation within said mass substantially opposite the end of said exhaust tube.

12. A stem making apparatus comprising means for supporting a stem tube and an exhaust tube vertically, a pair of jaws and means for actuating them to clamp a glass mass formed by fusing portions of said tubes together, each of said jaws being provided with lugs extending upwardly from the top thereof.

13. A stem making apparatus comprising means for supporting a stem tube and an exhaust tube vertically, a pair of jaws and means for actuating them to clamp a glass mass formed by fusing portions of said tubes together, each of said jaws being provided with lugs extending upwardly and inwardly from the top thereof.

In witness whereof, we have hereunto set our hands this 13th day of January, 1925.

ROSCOE G. PHELPS.
ANTON RAUS.